United States Patent
Song et al.

(10) Patent No.: US 11,767,455 B2
(45) Date of Patent: Sep. 26, 2023

(54) SUPERHYDROPHOBIC HEMISPHERICAL ARRAY WHICH CAN REALIZE DROPLET PANCAKE BOUNCING PHENOMENON

(71) Applicant: DALIAN UNIVERSITY OF TECHNOLOGY, Liaoning (CN)

(72) Inventors: Jinlong Song, Liaoning (CN); Liu Huang, Liaoning (CN); Xin Liu, Liaoning (CN); Xuyue Wang, Liaoning (CN); Yuwen Sun, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 612 days.

(21) Appl. No.: 17/042,462

(22) PCT Filed: May 7, 2019

(86) PCT No.: PCT/CN2019/085758
§ 371 (c)(1),
(2) Date: Sep. 28, 2020

(87) PCT Pub. No.: WO2020/223887
PCT Pub. Date: Nov. 12, 2020

(65) Prior Publication Data
US 2021/0155837 A1    May 27, 2021

(51) Int. Cl.
*C09K 3/18*    (2006.01)

(52) U.S. Cl.
CPC ...................... *C09K 3/18* (2013.01)

(58) Field of Classification Search
CPC ...... C09K 3/18; B08B 17/065; C09D 5/1681; C08J 7/12; C25F 3/04
See application file for complete search history.

(56) References Cited

U.S. PATENT DOCUMENTS

| | | |
|---|---|---|
| 2019/0118232 A1 | 4/2019 | Dhiman et al. |
| 2019/0127856 A1 | 5/2019 | Wang et al. |

FOREIGN PATENT DOCUMENTS

| | | |
|---|---|---|
| CN | 106807608 A | 6/2017 |
| CN | 107573531 A | 1/2018 |
| CN | 109679127 A | 4/2019 |
| CN | 107364054 B | 6/2019 |

OTHER PUBLICATIONS

Hao et al, "Superhydrophobic-like tunable droplet bouncing on slippery liquid interfaces", Nat. Commun. 6:7986 doi: 10.1038/ncomms8986 (Year: 2015).*
Moqaddam et al, "Drops bouncing off macro-textured superhydrophobic surfaces", J. Fluid Mech. (2017), vol. 824, pp. 866-885. doi:10.1017/jfm.2017.306 (Year: 2017).*
Bird, James C. et al. "Reducing the contact time of a bouncing drop," Nature, Research Letter 12740, vol. 503, Macmillan Publishers Limited, Nov. 21, 2013, pp. 385-388 (14 pages).
Liu, Yahua et al., "Pancake bouncing on superhydrophobic surfaces," Nature Physics, vol. 10, Jul. 2014, Jun. 8, 2014, Macmillan Publishers Limited, pp. 515-519.
Gauthier, Anal et al. "Water impacting on superhydrophobic," Nature Communications, 6:8001, Aug. 11, 2015, Macmillan Publishers Limited, 6 pages.
Liu, Yahua et al., "Symmetry breaking in drop bouncing on curved surfaces," Nature Communications, 6:10034, Nov. 25, 2015, Macmillan Publishers Limited, 8 pages.
Bro, Jonas Anderson, (Hecksher) et al. "The macroscopic pancake bounce," European Journal of Physics, vol. 38, Issue No. 1, 38:015006, Published Dec. 13, 2016, IOP Publishing Ltd., 11 pages.
Dalian University of Technology, "Research on Superhydrophobic columnar array structures capable of droplet pancake bouncing," May 25, 2017, 68 pages.
Song, Jinloing, et al., "Large-Area Fabrication of Droplet Pancake Bouncing Surface and Control of Bouncing State," American Chemical Society, NANO, vol. 11, Aug. 22, 2017, pp. 9259-9267.

* cited by examiner

*Primary Examiner* — Anthony J Green
(74) *Attorney, Agent, or Firm* — MUNCY, GEISSLER, OLDS & LOWE, P.C.

(57) ABSTRACT

A superhydrophobic hemispherical array which can realize droplet pancake bouncing phenomenon is provided. The superhydrophobic hemispherical array shows an arc-shape structure which is narrow at the top and wide at the bottom, where a is the angle that substrate-gas interface goes across the gas and reaches substrate-hemisphere interface, d refers to the diameter of the contact area between hemispherical structure and substrate, s represents the space between two adjoining hemispheres, h denotes the vertical height from the top of hemisphere to substrate surface, and 70°≤a≤90°, 900 µm≤d ≤1700 µm, s≤550 µm, 600 µm≤h≤1100 µm, respectively. The superhydrophobic hemispherical array has a water contact angle larger than 150° and roll-off angle lower than 10°.

1 Claim, 1 Drawing Sheet

-0.5 ms　　　0 ms　　　1.5 ms 4.5 ms　　　11.4 ms　　　14.7 ms

SUPERHYDROPHOBIC HEMISPHERICAL ARRAY WHICH CAN REALIZE DROPLET PANCAKE BOUNCING PHENOMENON

FIELD OF THE INVENTION

The present invention relates to functional material field, and more particularly to a superhydrophobic hemispherical array which can realize droplet pancake bouncing phenomenon.

BACKGROUND OF THE INVENTION

In view of safety problems that freezing rain might cause such as the breakage in transmission line, the increase of aircraft drag, the reduction of the friction of vehicle and highway, researchers have been devoted to prevent freezing rain from adhering by the fact that water droplets impact on specific superhydrophobic surfaces with a short liquid-solid contact time and are easy to roll. For droplet with a certain volume, the liquid-solid contact time hardly changes with the impact velocity. Thus, how to further reduce the liquid-solid contact time is of great significance to improve anti-freezing and anti-icing properties of superhydrophobic surfaces. From 2013 to 2015, researchers have founded that the liquid-solid contact time could be reduced in a certain degree when water droplets impinged on the striplike ridge with a height of ~180 μm on the flat superhydrophobic surfaces (Nature. 2013, 503:385-388), the striplike ridge textures with diameter or height of tens to hundreds of millimetres on the flat superhydrophobic surfaces (Nature Communications. 2015, 6:8001), and the striplike cylindrically curved surfaces of a few millimetres in diameter which was laterally placed on the superhydrophobic flat surfaces (Nature Communications. 2015, 6:10034). However, the aforementioned surface textures were not suitable for practical applications for the reason that most of the raindrops could not drip on the ridges or cylindrically curved surfaces in practice.

In 2014, Liu et al. first observed pancake bouncing on the superhydrophobic conical or square pillar arrays with 20-100 μm diameter, 800-1200 μm height and 100 μm space, and the liquid-solid contact time was reduced by ~80% (Nature Physics, 2014, 10:515-519). These submillimeter-scale pillar arrays can ensure that all water droplets drip on the surface textures, which are suitable for practical applications. In 2016, Hecksher et al. succeed in magnifying the scale by nearly 100 times and realized macroscopic pancake bouncing phenomenon when water balloons impacted on a bed of nails with a space of 1.85 cm (European Journal of Physics, 2016, 38:015006). In 2017, applicants have found that pancake bouncing could be also observed on the superhydrophobic cylindrical arrays with ≤1250 μm diameter, 600-1000 μm height and ≤250 μm space which were easy for large-area fabrication (ACS Nano, 2017, 11:9259-9267, patent No. 201710555340.4 and 201710568996.X). However, superhydrophobic conical, square, and cylindrical pillar arrays with too large height-diameter ratio and low mechanical strength, could cause high aircraft drag and affect their practical applications while applied to aircraft surfaces. Thus, it is extremely important to design a new texture array with smaller height-diameter ratio, higher mechanical strength and effective drag reduction.

SUMMARY OF THE INVENTION

This invention aims to provide a superhydrophobic hemispherical array which can realize droplet pancake bouncing phenomenon. When water droplets impact on a superhydrophobic hemispherical array, the hemispherical array can collect a large amount of capillary energy and then release, resulting in droplet pancake bouncing.

The technical solution of the present invention:

A superhydrophobic hemispherical array which can realize droplet pancake bouncing phenomenon, wherein the superhydrophobic hemispherical array shows an arc-shape structure which is narrow at the top and wide at the bottom, where a is the angle that substrate-gas interface goes across the gas and reaches substrate-hemisphere interface, d refers to the diameter of the contact area between hemispherical structure and substrate, s represents the space between two adjoining hemispheres, h denotes the vertical height from the top of hemisphere to substrate surface, and $70°≤a≤90°$, 900 μm≤d ≤1700 μm, s≤550 μm, 600 μm≤h≤1100 μm, respectively. The aforementioned superhydrophobic hemispherical array has a water contact angle larger than $150°$ and roll-off angle lower than $10°$.

The advantages of the present invention:
(1) The present invention proposes a novel texture which can realize droplet pancake bouncing phenomenon—superhydrophobic hemispherical array.
(2) The proposed superhydrophobic hemispherical array has a height-diameter ratio larger than 0.48.
(3) Compared with previous superhydrophobic conical, square, and cylindrical pillar arrays which can realize droplet pancake bouncing phenomenon, the proposed superhydrophobic hemispherical arrays have better mechanical strength.

DETAILED DESCRIPTION

The specific embodiments of the present invention will be further described below in conjunction with the drawings and technical solutions.

Embodiment

Figure 1:
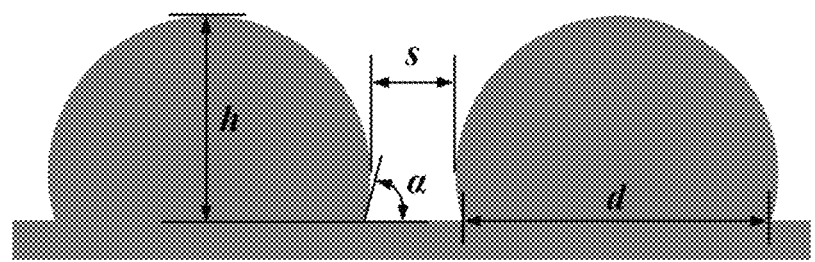
FIG. 1 shows a schematic illustration of the structural parameters of a superhydrophobic hemispherical array.
Figure 2:
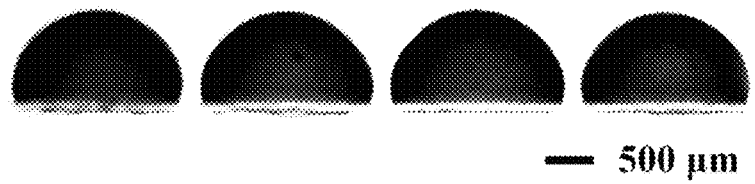
FIG. 2 shows a structural diagram of the superhydrophobic hemispherical array with $a=71°$, $d=1570$ μm, $s=160$ μm, and $h=890$ μm.
Figure 3:
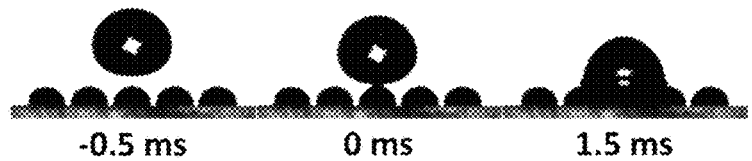
FIG. 3 shows the bouncing dynamics of a 21.0 μL water droplet impacting on the superhydrophobic hemispherical array with $a=71°$, $d=1570$ μm, $s=160$ μm, and $h=890$ μm.
Figure 3:

A superhydrophobic hemispherical array which can realize droplet pancake bouncing phenomenon is presented in FIG. 2. It shows an arc-shape structure which is narrow at the top and wide at the bottom, where the angle that substrate-gas interface goes across the gas and reaches substrate-hemisphere interface is $a=71°$, the diameter of the contact area between hemispherical structure and substrate is $d=1570$ μm, the space between two adjoining hemispheres is $s=160$ μm, the vertical height from the top of hemisphere to substrate surface is $h=890$ μm, and the height-diameter ratio reaches 0.56. The aforementioned superhydrophobic hemispherical array has a water contact angle of $160°$ and roll-off angle of $3°$. As shown in FIG. 3, water droplet of 21.0 μL impacts on such a superhydrophobic hemispherical array and exhibits a pancake bouncing state.

The preparation process of the aforementioned superhydrophobic hemispherical array capable of realizing droplet pancake bouncing phenomenon is as follows:

(1) Pre-treatment: a Mg alloy plate of 30 mm×40 mm×2 mm was cleaned with acetone to degrease, mechanically polished using #800 and #1500 abrasive paper to remove surface oxide layer, then ultrasonically rinsed with deionized water, and drying.

(2) Mask preparation: the pre-treated Mg alloy plate was sequentially attached with photopolymer resist dry film HT200 and a mask with 600 μm hole diameter and 1.9 mm space, then exposed to a UV irradiation (360 nm) for 30 s to initiate photopolymerization, subsequently developed in a 5 wt % $NaCO_3$ solution for 2 min, and finally the masking patterns were copied onto the dry film.

Figure 4:
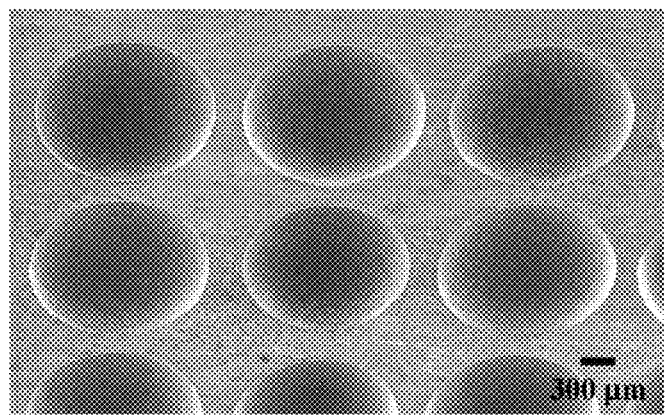
FIG. 4 shows a SEM image of a magnesium (Mg) alloy mold with hemispherical micro-dimple array on a scale of 300 μm.

(3) Electrochemical machining: the anodic marked Mg alloy plate and cathodic Cu plate of equal size were installed on the side punching fixture, which were separated by a distance of 1 mm With the pulse parameters of 14 $A \cdot cm^{-2}$ for current density, 20 kHz for frequency and 30% for duty cycle, the marked Mg alloy plate was electrochemical etched in a 15 wt % $NaNO_3$ electrolyte solution for 2 min which could fill the gap between electrodes through an electrolyte circulating system. Then, the Mg alloy plate was taken out and immersed into a 5 wt % NaOH solution for 4 min to remove the film. After subsequent cleaning and drying, the Mg alloy mold with hemispherical micro-dimple array was just prepared, as shown in FIG. 4.

(4) Micro/nano-scale structures construction: the Mg alloy mold obtained in step 3 was processed by nanosecond laser scanning at the frequency of 20 kHz, power of 50 W and scanning speed of 500 $mm \cdot s^{-1}$ followed by ultrasonic cleaning with deionized water and drying.

(5) Replication: PDMS solution was poured on the Mg alloy mold obtained in step 4, deaerated in vacuum for 2 h, then baked at 60 C for 6 h for the curing process, and finally the PDMS hemispherical array was easy to demould by hand.

(6) Superhydrophobic treatment: the PDMS hemispherical array obtained in step 5 was immersed into a 1 wt % ethanol solution of fluoroalkylsilane for 40 min and dried by heating. Thus, a superhydrophobic hemispherical array was fabricated, as shown in FIG. 2.

The invention claimed is:

1. A superhydrophobic hemispherical array which can realize droplet pancake bouncing phenomenon, wherein the superhydrophobic hemispherical array shows an arc-shape structure which is narrow at the top and wide at the bottom, where a is the angle that substrate-gas interface goes across the gas and reaches substrate-hemisphere interface, d refers to the diameter of the contact area between hemispherical structure and substrate, s represents the space between two adjoining hemispheres, h denotes the vertical height from the top of hemisphere to substrate surface, and $70°≤a≤90°$, 900 μm≤d≤1700 μm, s≤550 μm, 600 μm≤h≤1100 μm, h/d≥0.48, respectively; the superhydrophobic hemispherical array has a water contact angle larger than 150° and roll-off angle lower than 10°.

* * * * *